(12) United States Patent
Kupper et al.

(10) Patent No.: US 9,388,906 B2
(45) Date of Patent: Jul. 12, 2016

(54) SEAL ASSEMBLY

(75) Inventors: David G. Kupper, Edelstein, IL (US); Mark S. Diekevers, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 740 days.

(21) Appl. No.: 13/313,170

(22) Filed: Dec. 7, 2011

(65) Prior Publication Data
US 2012/0161399 A1 Jun. 28, 2012

Related U.S. Application Data

(60) Provisional application No. 61/426,570, filed on Dec. 23, 2010.

(51) Int. Cl.
*F16J 15/38* (2006.01)
*F16J 15/34* (2006.01)
*B62D 55/088* (2006.01)

(52) U.S. Cl.
CPC .......... *F16J 15/344* (2013.01); *B62D 55/0887* (2013.01)

(58) Field of Classification Search
USPC .......... 277/377, 380–382, 390, 393; 305/103, 305/104
See application file for complete search history.

(56) References Cited

U.S. PATENT DOCUMENTS

| | | | |
|---|---|---|---|
| 3,656,820 A * | 4/1972 | Pensa | 384/139 |
| 3,874,680 A * | 4/1975 | Mustoe et al. | 277/405 |
| 4,331,339 A | 5/1982 | Reinsma | |
| 4,343,479 A | 8/1982 | Fukuoka et al. | |
| 4,427,204 A * | 1/1984 | Alley | F16J 15/32 |
| | | | 277/372 |
| 4,436,315 A * | 3/1984 | Hatch et al. | 277/370 |
| 4,819,999 A * | 4/1989 | Livesay et al. | 305/103 |
| 4,824,123 A | 4/1989 | Chia et al. | |
| 5,501,471 A * | 3/1996 | Ohba | F16J 15/3464 |
| | | | 277/379 |
| 5,826,884 A * | 10/1998 | Anderton et al. | 277/396 |
| 6,086,069 A * | 7/2000 | Bedford | 277/380 |
| 6,102,408 A * | 8/2000 | Anderton | B62D 55/0887 |
| | | | 277/370 |
| 2004/0201176 A1* | 10/2004 | Bjornson | 277/370 |
| 2006/0022411 A1 | 2/2006 | Beardsley et al. | |
| 2008/0231110 A1* | 9/2008 | Mulligan et al. | 305/103 |

FOREIGN PATENT DOCUMENTS

| | | | |
|---|---|---|---|
| GB | 1182564 | | 2/1970 |
| JP | Sho56070169 | | 6/1981 |
| JP | 01049771 A | * | 2/1989 |
| JP | Hei3080159 | | 8/1991 |
| JP | Hei8226548 | | 3/1996 |
| JP | 2001521111 | | 11/2001 |
| WO | 8900523 | | 1/1989 |
| WO | WO 2008093160 A1 | * | 8/2008 |

* cited by examiner

*Primary Examiner* — Amber Anderson
*Assistant Examiner* — Stacy Warren
(74) *Attorney, Agent, or Firm* — Finnegan, Henderson, Farabow, Garrett & Dunner, LLP

(57) ABSTRACT

A seal assembly for sealing between a first member and a second member of a joint, the first member being able to pivot about an axis of the joint relative to the second member, is disclosed. The seal assembly includes a first ring, a load ring, a first seal ring, and a resilient second seal ring. The first ring is for a first seal cavity of the first member. The load ring is for a second seal cavity of the second member. The first seal ring may have a sealing surface extending in a radial direction. The resilient second seal ring may have an annular seal lip. The first seal ring is held stationary by the first ring in the first seal cavity of the first member, and the second seal ring is forced axially by the load ring into axial sealing engagement with the first seal ring.

20 Claims, 2 Drawing Sheets

SEAL ASSEMBLY

RELATED APPLICATIONS

This application is based upon, claims priority to, and otherwise claims the benefit of U.S. Provisional Application No. 61/426,570 by Mark S. Diekevers, et al., filed Dec. 23, 2010, the contents of which are expressly incorporated herein by reference.

TECHNICAL FIELD

The present disclosure relates to seals. More particularly, the present disclosure relates to a seal assembly for sealing between two pivotable members. Such a seal assembly may be used for sealing a track joint in a track chain.

BACKGROUND

In recent years, attention has been given to sealing joints in moving vehicles, and more particularly to an apparatus for sealing a track joint in a track chain. For example, crawler tractors, such as a bulldozer, typically have a sprocket, an idler, a track chain and a number of track shoes attached to the track chain for propelling the tractor over the ground. During use of the crawler tractor the sprocket rotates and engages the track chain, thereby causing the track chain, along with the attached track shoes, to rotate around a path defined by the sprocket and the idler. The rotation of the track chain causes the track shoes to engage the ground, thereby propelling the crawler tractor over the ground to perform various work functions.

Track chains generally include a pair of parallel chains, with each parallel chain being made up of a series of entrained master links and track links. Some track chains may further include a series of pins and bushings interposed between and connected to the parallel chains. The bushings and the entrained track links cooperate to form a number of track joints which allow the necessary movement of the bushings relative to the track links during use of the track chain, for example when the track chain rotates about the sprocket and the idler. Track joints are typically equipped with a track seal assembly to keep out various corrosive and abrasive mixtures of water, dirt, sand, rock or other mineral or chemical elements to which the track chain is exposed during its use. The track seal assembly also functions to keep a lubricant within the track joint to facilitate the aforementioned relative movement of the bushings and the track links.

A problem with track seal assemblies is to keep dirt out and keep lubrication within the track joint. Mud packing resistance should preferably be kept as high as possible. Another problem to consider is to maintain sealing capability. It is desired to maintain the different parts of a track seal assembly in place to avoid displacement of any parts and resulting loss of sealing capability. Wear life of a seal assembly may be a problem. The stability of a load ring and/or seal ring within a seal assembly may be a problem. A problem with seal assemblies may be to take up or compensate for misalignments within a seal assembly.

Other problems to consider alone or in combination with other mentioned problems relate to grooving of the different parts of a seal assembly. Grooving may arise by various abrasive particles found in the working environment of a track chain finding its way in to a seal assembly. If such grooving arises, then not only dirt may enter a track joint, but also lubrication within the track joint may escape.

It is further desirable to keep costs for manufacturing and/or assembling a seal assembly within a track joint down. It may also be desirable to avoid cumbersome arrangements. It may also be desirable to provide a simple assembling process of a track joint seal assembly.

The present invention is directed to overcoming one or more of the problems as set forth above.

SUMMARY OF THE INVENTION

In one aspect, the present disclosure is directed a seal assembly for sealing between a first member and a second member of a joint, the first member being able to pivot about an axis of the joint relative to the second member. The seal assembly includes a first ring, a load ring, a first seal ring, and a resilient second seal ring. The first ring is for a first seal cavity of the first member. The load ring is for a second seal cavity of the second member. The first seal ring may be of a metal having a sealing surface extending in a radial direction. The resilient second seal ring may have an annular seal lip. The first seal ring is held stationary by the first ring in the first seal cavity of the first member, and the second seal ring is forced axially by the load ring into axial sealing engagement with the first seal ring. A track joint may include such a seal assembly and a vehicle may include such a seal assembly. The first seal ring may be integral with a thrust ring.

At least one of the above embodiments provides one or more solutions to the problems and disadvantages with the background art. Other technical advantages of the present disclosure will be readily apparent to one skilled in the art from the following description and claims. Various embodiments of the present application obtain only a subset of the advantages set forth. No one advantage is critical to the embodiments. Any claimed embodiment may be technically combined with any other claimed embodiment(s).

BRIEF DESCRIPTION OF THE DRAWINGS

The accompanying drawings illustrate presently preferred exemplary embodiments of the disclosure, and together with the general description given above and the detailed description of the preferred embodiments given below, serve to explain, by way of example, the principles of the disclosure.

DETAILED DESCRIPTION

According to one embodiment, a seal assembly is provided having a first seal ring that is held stationary within a seal cavity. Together with a second seal ring, the seal assembly can accommodate high axial forces resulting in improved sealing.

Figure 1:
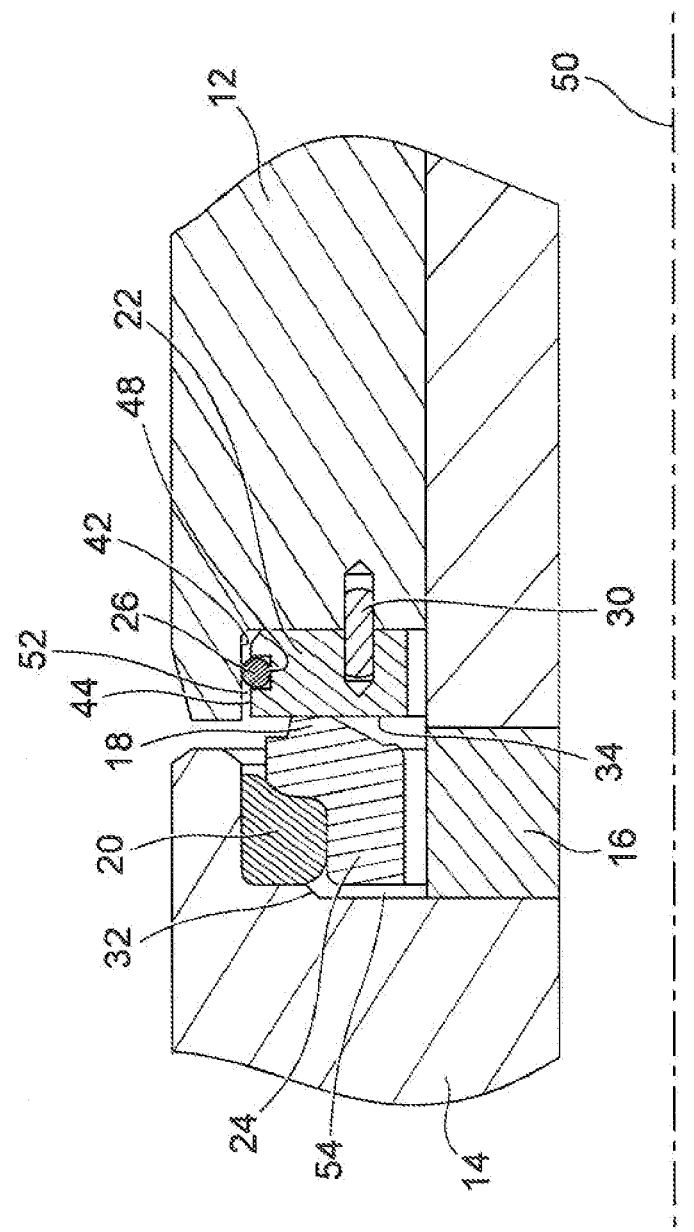
FIG. 1 is a diagrammatic illustration of a seal assembly according to an exemplary embodiment of the present disclosure.

Turning to FIG. 1, according to one embodiment, a seal assembly is provided for sealing between a first member 12 and a second member 14 of a joint, the first member 12 being able to pivot about an axis 50 of the joint relative to the second member 14. The seal assembly includes a first ring 26, a load ring 20, and first and second seal rings 22, 24. The first ring 26 may be in a first seal cavity 52 of the first member 12. The load ring 20 may be in a second seal cavity 54 of the second member 14. The first seal ring 22 may comprise metal and a sealing surface 34 extending in a radial direction. The second seal ring may be resilient and comprises an annular seal lip 18.

The first seal ring 22 may be held stationary by the first ring 26 in the first seal cavity 52 of the first member 12, and the second seal ring 24 may be forced axially by the load ring 20 into axial sealing engagement with the first seal ring 22.

In one embodiment, the first ring 26 is an o-ring 26. According to a further embodiment, the o-ring 26 is between a first annular surface 42 of the first seal cavity 52 and a second annular surface 44 of the first seal ring 22. The first annular surface 42 and the second annular surface 44 extends in the axial direction.

In one embodiment, the first seal ring 22 is held stationary by additional means in the first seal cavity 52. The additional means may, for example, be a retaining dowel 30 and/or an adhesive 46. In one embodiment, the additional means may, for example, be a second ring 28. In such an embodiment, the first ring 26 may be between surfaces extending in the axial direction and the second ring 28 may be between surfaces extending in the radial direction.

Figure 2:
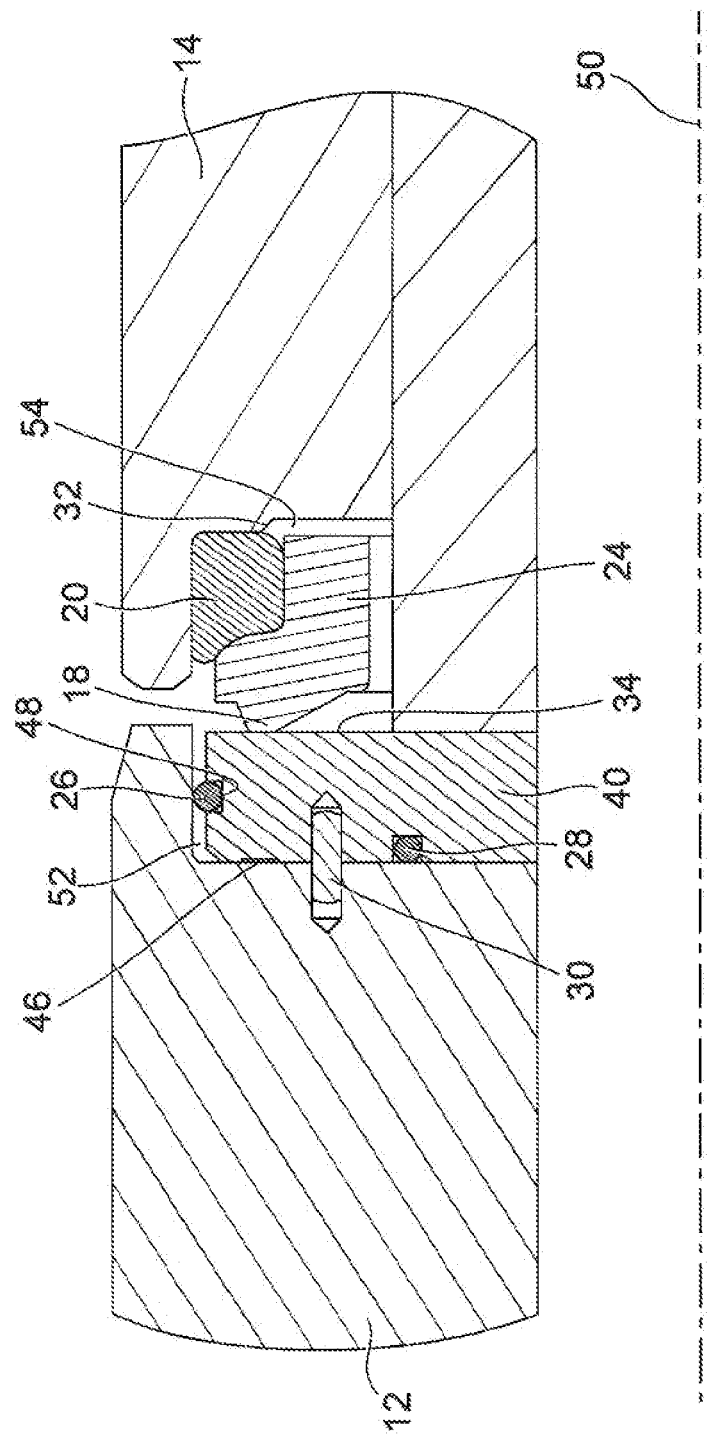
FIG. 2 is a diagrammatic illustration of a seal assembly according to an exemplary embodiment of the present disclosure.

FIG. 1 only illustrates the retaining dowel 30. FIG. 2 illustrates the retaining dowel 30, the second ring 28, and the adhesive 46. The second ring 28 and/or the adhesive 46 could as well be used for the embodiment illustrated in FIG. 1. The first seal ring 22, 40 may be held stationary within the first seal cavity 52 by any of the retaining dowel 30, the first ring 26, the second ring 28, and the adhesive 46, each by themselves or in combination. The first seal ring 22 may be held stationary within the first seal cavity 52 by any suitable means.

According to one embodiment, an annular groove 48 for one or both of the first and second rings 26, 28, may be provided. The annular grooves 48 may be provided in the first seal ring 22, 40. The annular grooves 48 may be provided in the first seal cavity 52. The first ring 26 and the second ring 28 may be o-rings.

Turning to FIG. 2, according to one embodiment the first seal ring 22 is integral with a thrust ring 16. Such an integrated first seal ring 22 and thrust ring 16 is illustrated as an integral seal/thrust ring 40. The integral seal/thrust ring 40 may be fabricated by powder metallurgy and may comprise a seal surface 34 for engaging the annular seal lip 18. The seal surface 34 may be made by placing a material via a high velocity oxygen fuel (HVOF) thermal spray process or a coating by a physical vapour deposition process. The integral seal/thrust ring 40 may be plastic impregnated. This would render the integral seal/thrust ring 40 leak proof.

According to one embodiment, the first seal ring 22 or the integral seal/thrust ring 40 may be of either an abrasion resistant or a corrosion resistant metal, or both. To provide a long lasting first seal ring 22 or integral seal/thrust ring 40, the metal part may be a hard stainless steel, or a stellite, or plain carbon steel with a corrosion and abrasion resistant coating. Any other coating chemistries and/or processes that could provide a suitable sealing surface may be used. According to one embodiment, the first seal ring 22 may comprise a seal surface 34 for engaging the annular seal lip 18 and the seal surface may be a material placed via high velocity oxygen fuel (HVOF) thermal spray process or a coating placed by a physical vapour deposition process.

According to one embodiment, the seal lip 18 may comprise urethane, thermoplastic, and/or polyurethane. According to a further embodiment, the first seal ring 22 or the integral seal/thrust ring 40 comprises stellite.

According to one embodiment, the second seal cavity 54 comprises an annular protrusion 32 engaging the load ring 20. The annular protrusion 32 may stabilize the load ring 20 and maintain it in its proper service position.

According to one embodiment, the second seal ring 24 has an L-shaped cross sectional configuration defining a first flange portion extending in a radial direction and a second flange portion extending in an axial direction. The annular seal lip 18 extends from first flange portion of the second seal ring 24.

According to one embodiment, a track joint may comprise an embodiment of the disclosed seal assembly. According to one embodiment, a vehicle may comprise an embodiment of the disclosed seal assembly.

INDUSTRIAL APPLICABILITY

At least one embodiment of the disclosed seal assemblies may be used for a track pin. A track joint may comprise such a seal assembly. Any vehicle may comprise such a seal assembly. Seal efficiency of such seal assemblies may be improved by the first seal ring held stationary within the seal cavity. Together with the second seal ring, the seal assembly can accommodate high axial forces resulting in improved sealing.

At least one embodiment may provide a seal assembly that keeps dirt out and keeps lubrication within the track joint. Mud packing resistance may be increased. At least one embodiment maintains sealing capability. Embodiments may maintain the different parts of a track seal assembly in place to avoid displacement of any parts and resulting loss of sealing capability. Wear life of the seal assembly may be increased. At least one embodiment provides stability for a load ring and/or seal ring within a seal assembly. At least one embodiment may take up or compensate for misalignments within a seal assembly. Grooving may be avoided.

At least one embodiment may keep costs for manufacturing and/or assembling a seal assembly within a track joint down. At least one embodiment may avoid cumbersome arrangements. The seal assembly may provide a simple assembling process of a track joint seal assembly.

It will be apparent to those skilled in the art that various modifications and variations can be made to the seal assembly. Other embodiments will be apparent to those skilled in the art from consideration of the specification and practice of the disclosed seal assembly. It is intended that the specification and examples be considered as exemplary only, with a true scope being indicated by the following claims and their equivalents.

What is claimed is:

1. A seal assembly for sealing between a first member and a second member of a joint, the first member being able to pivot about an axis of the joint relative to the second member, comprising:
   a first ring for a first seal cavity of the first member;
   a load ring for a second seal cavity of the second member;
   a first seal ring of metal having a sealing surface extending in a radial direction, the first seal ring having a groove receiving the first ring, the groove defined by a bottom surface and substantially parallel first and second side surfaces;
   a resilient second seal ring having an annular seal lip; and
   an inner member positioned circumferentially inside of the second member and in direct contact with the first seal ring,
   wherein the first seal ring is held stationary in the first seal cavity and in direct contact with the first member, and the second seal ring is forced axially by the load ring into axial sealing engagement with the first seal ring.

2. The seal assembly of claim 1, wherein the first ring is an o-ring.

3. The seal assembly of claim 2, wherein the o-ring is between a first annular surface of the first seal cavity and a second annular surface of the first seal ring, wherein the first and second annular surfaces extend in the axial direction.

4. The seal assembly of claim 1, wherein the first seal ring is held stationary by additional means in the first seal cavity.

5. The seal assembly of claim 4, wherein the additional means is a retaining dowel.

6. The seal assembly of claim 4, wherein the additional means is an adhesive.

7. The seal assembly of claim 4, wherein the additional means is a second ring.

8. The seal assembly of claim 7, wherein the first ring is between surfaces of the seal assembly extending in the axial direction and the second ring is between surfaces of the seal assembly extending in the radial direction.

9. The seal assembly of claim 7, further comprising an annular groove for the second ring.

10. The seal assembly of claim 7, wherein the first ring and the second ring are o-rings.

11. The seal assembly of claim 1, wherein the first seal ring is integral with a thrust ring.

12. The seal assembly of claim 11, wherein the thrust ring is fabricated by powder metallurgy and comprises the sealing surface for engaging the annular seal lip, and wherein the sealing surface comprises a material placed via high velocity oxygen fuel (HVOF) thermal spray process or a coating placed by a physical vapour deposition process.

13. The seal assembly of claim 1, wherein the first seal ring is of either an abrasion resistant or a corrosion resistant metal, or both.

14. The seal assembly of claim 1, wherein the first seal ring comprises the sealing surface for engaging the annular seal lip and the sealing surface comprises a material placed via high velocity oxygen fuel (HVOF) thermal spray process or a coating placed by a physical vapour deposition process.

15. The seal assembly of claim 1, wherein the seal lip comprises one out of the following group: urethane, thermoplastic, and polyurethane.

16. The seal assembly of claim 1, wherein the first seal ring comprises stellite.

17. The seal assembly of claim 1, further comprising an annular protrusion in the second seal cavity engaging the load ring.

18. The seal assembly of claim 1, wherein the second seal ring has an L-shaped cross sectional configuration defining a first flange portion extending in a radial direction and a second flange portion extending in an axial direction, and
wherein the annular seal lip extends from the first flange portion of the second seal ring.

19. A track joint comprising the seal assembly according to claim 1.

20. A vehicle comprising the seal assembly according to claim 1.

* * * * *